(12) United States Patent
Atasu et al.

(10) Patent No.: US 9,246,928 B2
(45) Date of Patent: Jan. 26, 2016

(54) COMPILING PATTERN CONTEXTS TO SCAN LANES UNDER INSTRUCTION EXECUTION CONSTRAINTS

(75) Inventors: Kubilay Atasu, Zurich (CH); Florian Dorfler, Zurich (CH); Christoph Hagleitner, Zurich (CH); Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 13/098,772

(22) Filed: May 2, 2011

(65) Prior Publication Data

US 2012/0284222 A1    Nov. 8, 2012

(51) Int. Cl.
*G06F 11/00*    (2006.01)
*H04L 29/06*    (2006.01)

(52) U.S. Cl.
CPC .................................. *H04L 63/1408* (2013.01)

(58) Field of Classification Search
CPC ................ G06F 17/30985; G06F 2207/025; H04L 63/1441; H04L 69/12
USPC ...................................... 726/23–24; 707/780
See application file for complete search history.

(56) References Cited

U.S. PATENT DOCUMENTS

| | | | | |
|---|---|---|---|---|
| 6,078,736 A * | 6/2000 | Guccione | ............ | G06F 17/5054 716/117 |
| 7,596,745 B2 * | 9/2009 | Dignum | ............... | G06F 17/2247 711/104 |
| 7,619,983 B2 * | 11/2009 | Panigrahy | ........... | H04L 63/0254 370/252 |
| 7,805,392 B1 * | 9/2010 | Steele | ............... | G06F 17/30982 706/48 |
| 7,877,401 B1 * | 1/2011 | Hostetter | .................. | G06F 7/02 707/758 |
| 8,498,956 B2 * | 7/2013 | Srinivasan | ............... | G06K 9/62 706/45 |
| 8,843,523 B2 * | 9/2014 | Noyes | ........................ | G06F 7/02 707/791 |
| 2007/0124146 A1 * | 5/2007 | Lunteren | ............. | H04L 63/1408 704/255 |
| 2007/0130140 A1 * | 6/2007 | Cytron | .............. | G06F 17/30985 1/1 |
| 2010/0312742 A1 * | 12/2010 | Atasu | .................. | H04L 63/0227 706/48 |
| 2012/0203761 A1 * | 8/2012 | Biran | ................. | G06K 9/00986 707/713 |
| 2014/0172766 A1 * | 6/2014 | Van Lunteren | ......... | G06F 9/444 706/48 |

OTHER PUBLICATIONS

Coin-Or, "Branch and Cut, an LP-Based" Branch-and-cut Library; retrieved from: http://www.coin-or.org/projects/Cdc.xml.; retrieved on May 16, 2011; pp. 1-2.
Garey, et al., "Computers and Intractability; A Guide to the Theory of NP-Completeness"; W.H. Freeman and Co.; 1979; pp. 1-4.
Kumar, et al., "Algorithms to Accelerate Multiple Regular Expressions Matching for Deep Packet Inspection"; In Proc. SIGCOMM '06; pp. 339-350; ACM, 2006.

(Continued)

*Primary Examiner* — Farid Homayounmehr
*Assistant Examiner* — Lizbeth Torres-Diaz
(74) *Attorney, Agent, or Firm* — Cantor Colburn LLP; Daniel Morris

(57) ABSTRACT

A technique for determining scan lanes is provided. For a set of patterns, a number of scan lanes is estimated to be utilized on an accelerator. The number of the scan lanes estimated for the set of patterns is iteratively incremented to optimize a throughput of the accelerator. The set of patterns is distributed to the number of the scan lanes as a distribution, and each one of the scan lanes has a predetermined number of engines. A size of a memory space is evaluated that is needed for the distribution to distribute the set of patterns onto the number of scan lanes.

20 Claims, 8 Drawing Sheets

(56) References Cited

OTHER PUBLICATIONS

Rohrer, et al., "Memory-Efficient Distribution of Regular Expressions for Fast Deep Packet Inspection"; In CODES + ISSS, pp. 147-154, 2009.
Sidhu, et al., "Fast Regular Expression Matching Using FPGAs"; In Proc. FCCM '01, pp. 227-238; IEEE, 2001.
Smith, et al., "Deflating the Big Bang: Fast and Scalable Deep Packet Inspection with Extended Finite Automata"; In Proc. SIGCOMM '08, pp. 207-218; ACM, 2008.
Snort, network instrusion detection system; retrieved from: http://www.snort.org/.; retrieved on May 13, 2011; pp. 1-4.
Sourdis, et al., "Regular Expression Matching in Reconfigurable Hardware"; J. Signal Process System, 51 (1):99-121, 2008.
van Lunteren, et al., "High-Performance Pattern-Matching for Intrusion Detection", In Proc. INFOCOM 2006, pp. 1-13; 2006.
Yu, et al., "Fast and Memory-Efficient Regular Expression Matching for Deep Packet Inspection", In Proc. ANCS '06; pp. 93-102; ACM, 2006.

* cited by examiner

COMPILING PATTERN CONTEXTS TO SCAN LANES UNDER INSTRUCTION EXECUTION CONSTRAINTS

BACKGROUND

Exemplary embodiments relate to communications, and more specifically, to scanning for patterns.

Packet scanning, also known as packet content scanning, is an important part of network security and application monitoring. Packets in a stream are mapped against a set of patterns to detect security threats or to gain information about the stream or packet stream. Due to their flexibility, regular expressions are a common way to define such patterns. Finite automata are typically used to implement regular expression scanning or parsing.

In contrast to Non-Deterministic Finite Automata (NFA), Deterministic Finite Automata (DFA) only requires one state transition per input value. This yields higher scanning or parsing rates and a smaller parse state which has to be maintained per flow. Therefore, DFA are utilized for Network Intrusion Detection Systems (NIDS) although they usually require more memory than NFA. Regular expressions can be compiled into NFAs and DFAs using well-known techniques.

Regarding NIDS, the frequency of network attacks increases every year, and the methods of attack are becoming more sophisticated. NIDS works to keep up with these trends. NIDS can apply very powerful and flexible content-filtering rules defined using regular expressions. This has triggered a substantial amount of research and product development in the area of hardware-based accelerators for pattern matching, as this seems to be a viable approach for scanning network data against the increasingly complex regular expressions at wire-speed processing rates of tens of gigabits per second.

Moreover, in typical network environments, the number of open sessions at any given time can be on the order of millions, and the streams are scanned in an interleaved fashion. Therefore, the internal state of the scanning engine has to be stored and reloaded whenever the input stream is switched.

BRIEF SUMMARY

According to an exemplary embodiment, a method for determining scan lanes is provided. The method includes for a set of patterns, estimating a number of scan lanes to be utilized on an accelerator, iteratively incrementing the number of the scan lanes estimated for the set of patterns to optimize a throughput of the accelerator. Also, the method includes distributing the set of patterns to the number of the scan lanes as a distribution, where each one of the scan lanes has a predetermined number of engines, and evaluating a size of a memory space needed for the distribution to distribute the set of patterns onto the number of scan lanes.

According to an exemplary embodiment, a computer system is configured to determine scan lanes. The computer system includes memory for storing a pattern compiler and a processor, functionally coupled to the memory. The processor is responsive to computer-executable instructions contained in the pattern compiler and configured for estimating a number of scan lanes to be utilized on an accelerator for a set of patterns, and iteratively incrementing the number of the scan lanes estimated for the set of patterns to optimize a throughput of the accelerator. The processor is configured for distributing the set of patterns to the number of the scan lanes as a distribution, each one of the scan lanes having a predetermined number of engines, and evaluating a size of a memory space needed for the distribution to distribute the set of patterns onto the number of scan lanes.

According to an exemplary embodiment, a computer program product for determining scan lanes is provided that includes a computer readable storage medium having computer readable program code embodied therewith. The computer readable program code is configured for estimating a number of scan lanes to be utilized on an accelerator for a set of patterns, and iteratively incrementing the number of the scan lanes estimated for the set of patterns to optimize a throughput of the accelerator. The code is configured for distributing the set of patterns to the number of the scan lanes as a distribution, where each one of the scan lanes having a predetermined number of engines, and evaluating a size of a memory space needed for the distribution to distribute the set of patterns onto the number of scan lanes.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Performance of the DFA based approaches depend on the storage efficiency of the compiled patterns. The amount of on-chip memory resources is usually very limited and cache misses result into costly main memory accesses. As a result, a number of research efforts targeted the compact encoding of DFAs, and various related optimizations and transformations. In particular, it is observed that combining a set of incompatible regular expressions in the same DFA results in a state space explosion, which can be mitigated by using multiple parallel DFA engines and by carefully distributing the regular expressions to the parallel DFA engines. The two additional techniques that appear to be effective in compressing the state space are the use of default rules, and the decomposition of complex regular expressions into a simpler sequence of regular expression fragments that can excite bitwise instructions and counters supported (implemented) by a dedicated post-processor (e.g., result processor).

Figure 1:
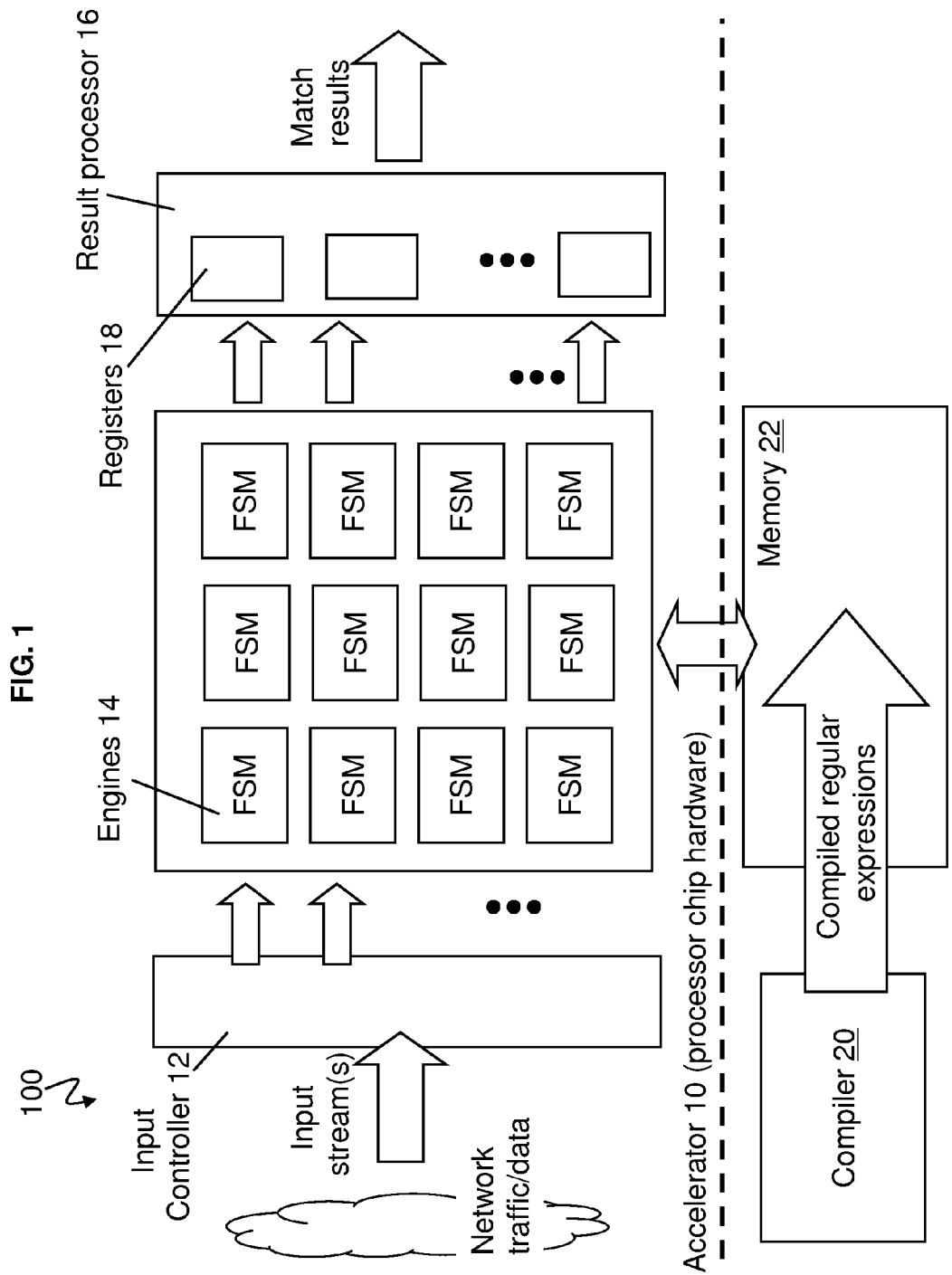
FIG. 1 depicts an architecture according to an exemplary embodiment.

Exemplary embodiments provide techniques for compiling large pattern contexts to a limited number of scan lanes for scanning patterns against a packet stream. Turning to the figures, FIG. 1 depicts an architecture 100 according to an exemplary embodiment.

Figure 2:
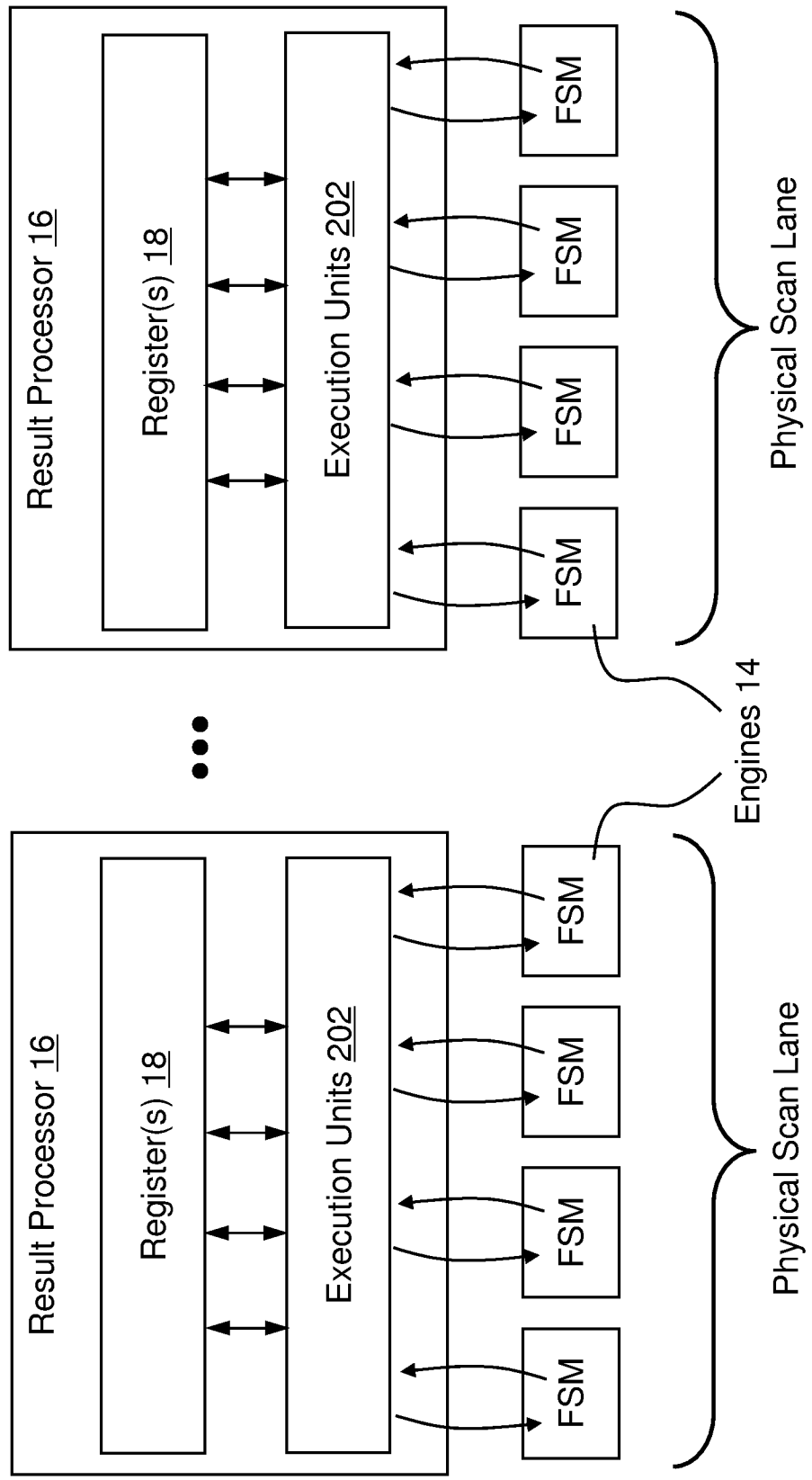
FIG. 2 depicts regular expression accelerator hardware that supports multiple independent physical scan lanes according to an exemplary embodiment.

The architecture 100 includes an example accelerator 10 on a chip. For example, there may be multiple accelerators 10 on multiple processor cores. The accelerator 10 includes an input controller 12 that receives input streams from, e.g., network data. The input controller 12 is configured to pass the input streams (e.g., as input values) to one or more engines 14 (e.g., pattern scanning engines). As one example, the engines 14 may be DFA engines which can be implemented using the BaRT-based Finite State Machine (B-FSM) technology. The engines 14 receive their respective input streams from the input controller 12 to determine if the input streams match patterns. Note that patterns and regular expressions may be utilized interchangeably. The engines 14 are state machines that are each configured to output an instruction to a result processor 16 when a regular expression fragment is matched in their respective input stream. Upon determining the match of a fragment, the engine 14 generates an instruction, and the instruction is executed in an execution unit 202 (shown in FIG. 2) in the result processor 16. The execution unit 202 modifies a register 18 (e.g., one or more registers 18) in the result processor 16. The result processor 18 may have multiple registers 18 for storing data. A group of engines 14 are physically connected to one another in a physical scan lane to connect to a corresponding register 18 (via the execution unit 202), while another group of engines 14 in a different physical scan lane connect to another register 18 (via a different execution unit 202) as shown in FIG. 2. The execution unit 202 in the result processor 16 is configured to combine the matches of the regular expression fragments by executing the instructions received from each engine 14 in its scan lane, and the result processor 16 outputs match results for the original regular expressions.

A compiler 20 (also referred to as a regular expression compiler and a pattern compiler) is configured to compile the patterns that are to be searched for by the engines 14. The compiler 20 outputs the patterns (e.g., compiles regular expressions) via memory 22 (e.g., main memory) and determines how the patterns should be distributed/applied to the various engines 14 based on the number of scan lanes and execution constraints (discussed herein) according to an exemplary embodiment. The patterns may represent various viruses, malware, worms, etc. The patterns output to the memory 22 from the compiler 20 are retrieved by the engines 14 and applied to engines 14 as determined by the compiler 20. Also, the compiler 20 may cause a particular pattern, particular patterns, and/or a part of a particular pattern to be distributed to a determined number of scan lanes (corresponding to a group of engines 14); each engine 14 in the designated scan lane(s) searches for its particular pattern and/or part of a pattern as determined by the compiler 20.

For ease of explanation, the compiler 20 is not shown on the chip for the accelerator 10 (but may be integrated in whole or in part on the accelerator 10). Also, in some implementations, the compiler 20 may be in or executed on a server, a computer system (e.g., shown in FIG. 8), etc. Also, the compiler 20 may be on the same computing system as the accelerator 10.

FIG. 2 depicts regular expression accelerator hardware (e.g., of the accelerator 10) that supports multiple independent physical scan lanes according to an exemplary embodiment. The accelerator hardware typically consists of multiple physical scan lanes, which can be virtualized to support millions of parallel search sessions. Each physical scan lane is composed of multiple synchronous engines 14 (e.g., a group of FSM engines). The engines 14 within the same scan lane can read and modify the contents of a shared register 18 through instructions that can be attached to state transitions. Instructions issued by different engines 14 on the same scan lane are executed synchronously by their corresponding execution unit 202 (for that particular scan lane). It is understood that there can be numerous accelerators 10, each with many independent physical scan lanes. Although FIG. 2 shows one execution unit 202 for a single physical scan lane corresponding to a particular register 18 (and/or particular group of registers 18), it is understood that multiple execution units 202 can correspond to a single scan lane of engines 14. The one or more execution units 202 per scan lane operate independently of a different scan lane having one or more execution units 202.

Having multiple independent physical scan lanes enables multiple independent search sessions to be run in parallel by search software. Virtualization of the physical lanes enables millions of search sessions to be run concurrently and invisibly to the users. Note that each scan lane implements multiple synchronous engines 14. This allows compiler 20 to take advantage of the pattern distribution techniques that minimize the state space (i.e., memory of the engines 14) by taking into account pattern incompatibilities. Note also that the engines 14 support parallel default rule look-ups to further reduce the state space. In addition, certain instructions can be attached to both regular transition rules and default transition rules according to the determination (pre-processing) by the compiler 20. In this way, complex regular expressions can be decomposed into multiple smaller fragments by the compiler 20, which are matched independently by the engines 14 within the same lane. The independent regular expressions fragments can collectively produce a match for the original regular expression. The interaction between the independent matches of the fragments is established through the shared register file, such the register 18, and a set of instructions supported by the execution units 202.

Note that matching complex sets of regular expressions can necessitate the use of multiple scan lanes (e.g., 1, 2, 3, 4, etc.) per search session. Such a situation occurs if it is not possible to avoid the state space explosion using only a single scan lane, or if, for instance, regular expression transformations generate too many incompatible instructions that cannot be handled by the instruction execution logic of a single lane. However, the use of multiple scan lanes per search session can effectively reduce the overall throughput because there are only a limited number of available physical lanes (because there are a certain number of physical registers 18, execution units 202, and engines 14 per result processor 16), and there can be millions of search sessions competing for the available physical lanes. Consequently, the compiler 20 is configured to compute the minimum number of physical scan lanes that guarantees a feasible mapping of the regular expressions to the accelerator hardware (e.g., the accelerator 10) while avoiding the state space explosion; as such, computing the minimum number of lanes to map the regular expressions onto the corresponding engines 14 on those physical scan lanes can optimize the accelerator 10 throughput. The compiler 20 is configured to determine the optimal number of scan lanes needed to map patterns to the engines 14 in the determined number of physical scan lanes while avoiding the state space explosion.

The compiler 20 is configured to maximize the throughput of the accelerator 10. The throughput is the processing speed of the accelerator to process the input streams into the input controller 12 from the network traffic at a certain rate to then output match results via the result processor 16.

Figure 3:
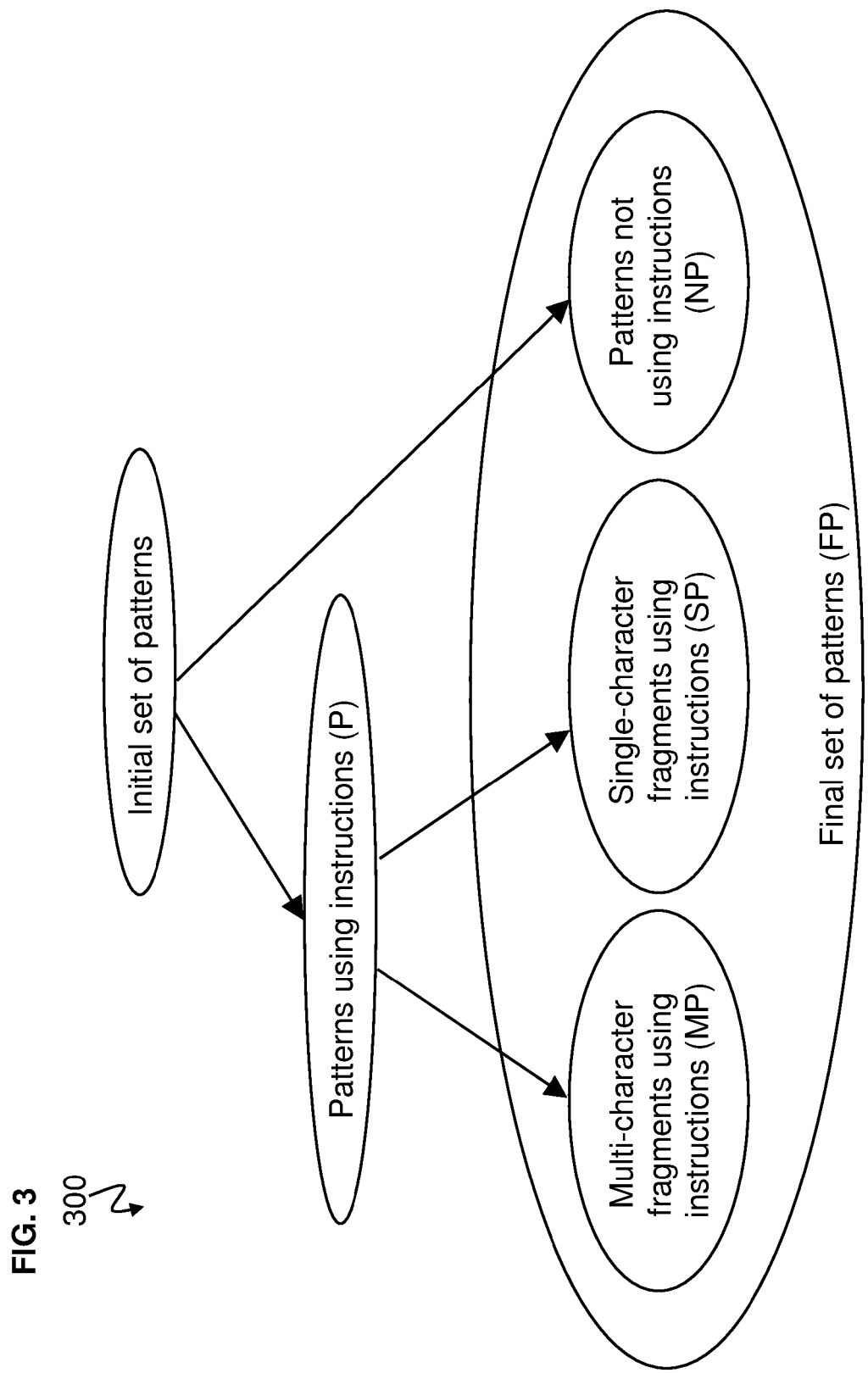
FIG. 3 depicts a diagram for decomposing regular expressions by a compiler according to an exemplary embodiment.

FIG. 3 depicts a diagram 300 for decomposing regular expressions by the compiler 20 according to an exemplary embodiment. A selected subset of the initial set of patterns is decomposed by the compiler 20 into multi-character and single-character fragments that incorporate instructions.

Assume that the network traffic is scanned against a given set of regular expressions, denoted as the initial set of patterns in FIG. 2. First, the compiler 20 is configured to analyze patterns in the initial set of patterns to determine if the patterns can be decomposed into smaller fragments that can take advantage of the instructions supported by the architecture of the accelerator 10, and whether such a decomposition helps in reducing the state space. State space refers to the amount of memory utilized by the engines 14 (e.g., in their respective transition rule memory 714 shown in FIG. 7).

Next, two non-intersecting pattern sets may be generated by the compiler 20: (1) the set of patterns that are transformed to use instructions; and (2) the set of patterns that do not benefit from using instructions. The set of patterns that are transformed to use instructions are denoted as P in the disclosure. Note that the patterns in P can be decomposed by the compiler 20 into single character and multiple character fragments that use instructions.

In FIG. 2, the set of single character fragments using instructions are denoted as SP, the set of multiple character fragments using instructions are denoted as MP, and the patterns not using instructions are denoted as NP. If default transition rules are used to compress the state space, the instructions that are associated with the single character fragments of the patterns in P can be stored with the default transition rules in dedicated look-up tables, which allow single cycle state transitions via parallel default rule look-ups. Supporting parallel default rule look-ups, on the other hand, requires support for parallel execution of the instructions associated with the single character fragments and the instructions associated with the multiple character fragments. The instructions associated with single-character fragments are called default instructions, and the instructions associated with multiple-character fragments are called regular instructions. The issue and execution logic for the default instructions and the regular instructions can be independently optimized in the accelerator architecture.

Given a set of search scan lanes, denoted as L, and assuming that the number of parallel state machines (e.g., four engines 14 in each physical lane shown in FIG. 2) available in each search (scan) lane is ENGINES_PER_LANE, below discusses using an integer linear programming (ILP) model (implemented by the compiler 20), which tries to find a feasible distribution of the patterns in P to the lanes in L by taking into account various constraints observed in an accelerator architecture (e.g., such as the accelerator architecture shown in FIG. 2 that has a certain number of engines 14 per scan lane). Although the functions of the compiler 20 may be explained utilizing the ILP model, it is understood that other programming models may be utilized, and the compiler 20 is not meant to be limited.

The ILP model of the compiler 20 supports and accounts for (but is not limited to) the following features: 1) constraints on the total number of bits provided in the registers (e.g., register 18) of a scan lane; 2) constraints on the total number of bits that can be accessed by an instruction; 3) constraints on the number of default instructions that can be issued per cycle (of the accelerator 10) by each scan lane and/or by each scan engine (e.g., engine 14); 4) constraints on the number of regular instructions that can be issued per cycle by each scan lane and/or by each scan engine; 5) constraints on the total number of instructions that can be issued per cycle by each scan lane and/or by each scan engine; and 6) an objective function that computes a feasible distribution of the patterns to the scan lanes and engines (shown in FIG. 2), optionally taking into account pattern incompatibilities defined in terms of pairwise cost functions.

Figure 4:
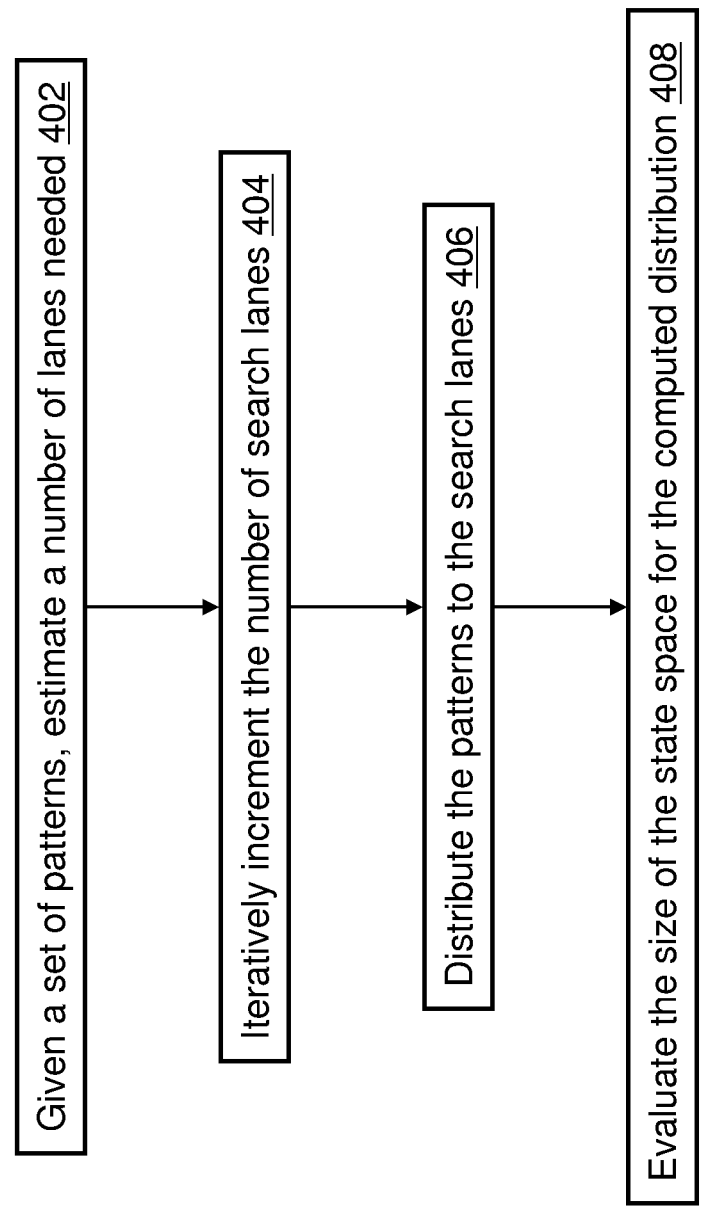
FIG. 4 depicts a flow chart of an optimization approach by a compiler according to an exemplary embodiment.

The ILP based model and solution forms part of an optimization approach for the compiler 20. FIG. 4 depicts a flow chart 400 of the optimization approach by the compiler 20 according to an exemplary embodiment. For example, given a set of patterns, the optimization approach of the compiler 20 starts with an estimation of the number of lanes needed (block 402), iteratively increments the number of search lanes to optimize the throughput of the accelerator 10 (block 404), distributes the patterns to the search lanes (block 406), and evaluates the size of the state space (memory size of the engines 14 in the determined number of scan lanes) for the computed distribution (block 408). Such an approach, not only provides the absolute minimum number of lanes needed to find a feasible distribution, but also enables the compiler 20 to evaluate the size of the state space as a function of the number of scan lanes. As such, this helps the compiler 20 to identify the lane count (LC) that results in the best throughput on the accelerator architecture, such as in FIGS. 1 and 2.

The compiler 20 is configured to formalize and solve the pattern distribution and lane count estimation problems in the presence of the architectural constraints imposed by the instruction issue logic. For example, the compiler 20 is configured to take into account the constraints (including, e.g., the number of instructions for engines 14 that can be executed simultaneously per cycle per scan lane) on the execution unit 202 that is utilized in that scan lane.

For distributing patterns on the engines 14, various constraints (i.e., architectural constraints of the accelerator 10 hardware in FIGS. 1 and 2) are taken into account and optimized by the compiler 20 as discussed in detail below. The following details may be discussed utilizing the integer linear programming (ILP) model for explanation purposes and not limitation: bits per lane constraint, default instructions per cycle constraint, unlimited bit access per instruction, limited bit access per instruction, and supporting per engine constraints.

In one implementation of the ILP model for the compiler 20, the binary decision variable $x_{p,l} \in \{0, 1\}$ indicates whether pattern p is assigned to lane l ($x_{p,l}=1$) or not ($x_{p,l}=0$) for $p \in \{1 \ldots |P|\}$, $l \in \{1 \ldots |L|\}$. The following makes sure that each pattern is mapped to exactly one lane:

$$\sum_{l=1}^{|L|} x_{p,l} = 1, p \in \{1 \ldots |P|\}. \quad \text{(Eq. 1)}$$

Note that this basic formulation introduces $|P||L|$ integer decision variables.

Regarding the bits per lane constraint of the compiler 20, let V represent the set of variables used by the patterns in P. Note that the variables in V can be shared by multiple patterns in P, and each variable can consume multiple bits.

The binary decision variable $y_{v,l} \in \{0,1\}$ indicates whether variable v is allocated in lane l ($y_{v,l}=1$) or not ($y_{v,l}=0$) for $v \in \{1 \ldots |V|\}$, $l \in \{1 \ldots |L|\}$. Note that a variable can be allocated in more than one lane depending on the assignment of the patterns in P to the lanes in L.

Let users(v) $\subset$ P denote the set of patterns using variable v, and let bitcount(v) denote the number of bits consumed by variable v. Note that both users(v) and bitcount(v) are pre-computed values. The following establishes the relationship between patterns and variables:

$$y_{v,l} = \underset{p \in users(v)}{V} x_{p,1}, v \in \{1 \ldots |V|\}, l \in \{1 \ldots |L|\}. \quad \text{(Eq. 2)}$$

The following constraint guarantees that the number of bits assigned to a lane is at most BITS_PER_LANE:

$$\sum_{v=1}^{|V|} bitcount(v) * y_{v,l} <= \text{BITS\_PER\_LANE}, \quad \text{(Eq. 3)}$$

$$l \in \{1 \ldots |L|\}.$$

The bits per lane constraint defines |V||L| integer variables.

Now, regarding the default instructions per cycle constraint of the compiler 20, it is assumed that at each cycle, the accelerator (e.g., accelerator 10) consumes one input character and each scan engine (e.g., engine 14) makes a transition to the next state based on the input character and its current state. However, the following description applies to a multiplicity of input characters as well. Note that, while making a state transition, each scan engine (e.g., shown in FIG. 7) can issue one or more default instructions and regular instructions. Let C denote the set of input characters, for which default instructions are generated by the patterns in P. Let $T_c$ denote the different types of default instructions that are executed while processing an input character c∈C given the pattern set P. It is assumed that the accelerator (e.g., accelerator 10) can execute a collection of different instructions of the same type as a single instruction. However, the number of bits on which a single instruction can operate is limited.

The constraints regarding unlimited bit access per instruction described below guarantee that no more than DEF_INST_PER_CYCLE_PER_LANE default instructions are executed per character and per lane, assuming that each instruction can access all of the bits available in the registers of a lane (e.g., register 18 for a scan lane as shown in FIG. 2). The constraints regarding limited bit access per instruction below are more general in the sense that the number of instructions are counted while imposing an upper limit (i.e., BITS_PER_INSTRUCTION) on the number of bits that can be accessed by a single instruction. Finally, the supporting per engine constraints discussed below describe a way of extending the formulation given in this section to support constraints on the number of default instructions issued per cycle by each scan engine (e.g., each engine 14).

Regarding the unlimited bit access per instruction constraints of the compiler 20, the binary decision variable $z_{t,c,l} \in \{0, 1\}$ indicates whether a default instruction of type t should be executed on character c, on lane l ($z_{t,c,l}=1$) or not ($z_{t,c,l}=0$). Let generators(t,c) $\subset$ P denote the set of patterns generating default instructions of type t on character c.

The following establishes the relationship between $z_{t,c,l}$ and $x_{p,l}$:

$$z_{t,c,l} = \underset{p \in generators(t,c)}{V} x_{p,1}, c \in \{1 \ldots |C|\}, t \in \{1 \ldots |T_c|\}, \quad \text{(Eq. 4)}$$

$$l \in \{1 \ldots |L|\}.$$

The following constrains the number of different types of default instructions executed on the same character and on the same lane:

$$\sum_{t=1}^{|T_c|} z_{t,c,l} <= \text{DEF\_INST\_PER\_CYCLE\_PER\_LANE}, \quad \text{(Eq. 5)}$$

$$c \in \{1 \ldots |C|\}, l \in \{1 \ldots |L|\}.$$

This section defines $(\Sigma_{c \in C}|T_c|)|L|$ as additional integer variables.

Regarding limited bit access per instruction constraint of the compiler 20, distribution of the patterns to the lanes may result in multiple default instructions of the same type being mapped to the same lane for the same character. In such cases, instructions that simultaneously access a collection of bits associated with different patterns are needed. Assume that the number of bits simultaneously accessible by an instruction is limited to BITS_PER_INSTRUCTION by the underlying architecture. If the number of bits accessed simultaneously by the instructions of the same type exceeds BITS_PER_INSTRUCTION, multiple different instructions of the same type has to be generated, where each instruction uses at most BITS_PER_INSTRUCTION bits. To support such a scenario, the constraints defined for Equations 4 and 5 above will now be revised.

Let $z_{t,c,l} \in Z$ denote the number of instructions of type t executed on character c on lane l. Let $u_{t,c,l} \in Z$ denote the number of bits accessed by the default instructions of type t on character c, on lane l. Let $w_{v,t,c,l} \in \{0,1\}$ indicate whether variable v is accessed by a default instruction of type t on character c, on lane l ($w_{v,t,c,l}=1$) or not ($w_{v,t,c,l}=0$). Let def_users(v, t, c) denote the set of patterns accessing variable v using a default instruction of type t on character c. Note that $w_{v,t,c,l}$ is defined only if def_users(v,t,c) is not empty. The following establishes the relationship between $w_{v,t,c,l}$ and $x_{p,l}$:

$$w_{v,t,c,l} = \underset{p \in def\_users(v,t,c)}{V} x_{p,1}, \quad \text{(Eq. 6)}$$

$$v \in \{1 \ldots |V|\}, c \in \{1 \ldots |C|\},$$

$$t \in \{1 \ldots |T_c|\}, l \in \{1 \ldots |L|\}.$$

The following establishes the relationship between $u_{t,c,l}$ and $w_{v,t,c,l}$:

$$u_{t,c,l} = \sum_{v=1}^{|V|} bitcount(v) * w_{v,t,c,l}, c \in \{1 \ldots |C|\}, \quad \text{(Eq. 7)}$$

$$t \in \{1 \ldots |T_c|\}, l \in \{1 \ldots |L|\}.$$

The following establishes the relationship between $z_{t,c,l}$ and $u_{t,c,l}$:

$$z_{t,c,l} >= u_{t,c,l}/\text{BITS\_PER\_INSTRUCTION}, c \in \{1 \ldots |C|\}, t \in \{1 \ldots |T_c|\}, l \in \{1 \ldots |L|\}. \quad \text{(Eq. 8)}$$

The following constrains the number of default instructions executed on the same character and on the same lane:

$$\sum_{t=1}^{T_c} z_{t,c,l} <= \text{DEF\_INST\_PER\_CYCLE\_PER\_LANE}, \quad \text{(Eq. 9)}$$

$$c \in \{1 \ldots |C|\}, l \in \{1 \ldots |L|\}.$$

In a worst case scenario, this section may define up to $2(\Sigma_{c \in C}|T_c|)|L|+|V|(\Sigma_{c \subset C}|T_c|)|L|$ additional integer variables. In other cases, the number may be much smaller because $w_{v,t,c,l}$ is often undefined for many v, t,c,l combinations.

In supporting per engine constraints on the compiler 20, assume that at most DEF_INST_PER_CYCLE_PER_LANE default instructions can be issued by the accelerator architecture per cycle and per engine (e.g., per engine 14).

Let E=ENGINES_PER_LANE*|L|. The binary decision variable $m_{sp,e} \in \{0,1\}$ indicates whether pattern sp is assigned to engine e ($m_{sp,e}=1$) or not ($m_{sp,e}=0$) for sp$\in\{1 \ldots |S|\}$, e$\in\{1 \ldots |E|\}$. Let orig(sp)$\in\{1 \ldots |P|\}$ denote the original pattern id of the fragment sp in P. The following makes sure that the engine assignment is compatible with the lane assignment:

$$\sum_{e=\text{ENGINES\_PER\_LANE}*(l-1)}^{\text{ENGNIES\_PER\_LANE}*l} m_{sp,e} = x_{orig(sp),l}, \quad \text{(Eq. 10)}$$

$$sp \in \{1 \ldots |SP|\}, l \in \{1 \ldots |L|\}.$$

In this section, |SP||E| have been introduced as integer variables. Note that the number of default instructions executed per character and per engine can be computed by using constraints similar to those described above for unlimited bit access per instruction and for limited bit access per instruction, and by replacing L with E, P with SP, p with sp, $x_{p,l}$ with $m_{sp,e}$, and replacing DEF_INST_PER_CYCLE_PER_LANE with DEF_INST_PER_CYCLE_PER_ENGINE.

Now, the regular instructions per cycle constraint will be discussed which includes: unlimited bit access per instruction, limited bit access per instruction, and supporting per lane constraints.

Regarding the regular instructions per cycle constraint of the compiler 20, assume that at most REG_INST_PER_CYCLE_PER_ENGINE regular instructions can be issued by the accelerator architecture per cycle and per engine (e.g., engine 14). To formulate this constraint, one constructs a DFA (e.g., B-FSM), which combines all the patterns in MP. Let S denote the set of states in the combined DFA that execute more than REG_INST_PER_CYCLE_PER_ENGINE instructions. Let Ts denote the different types of instructions that are executed on state s$\in$S.

Let E=ENGINES_PER_LANE*|L|. The binary decision variable $m_{mp,e} \in \{0,1\}$ indicates whether pattern mp is assigned to engine e ($m_{mp,e}=1$) or not ($m_{mp,e}=0$) for mp$\in\{1 \ldots |MP|\}$, e$\in\{1 \ldots |E|\}$. Let orig(mp)$\in\{1 \ldots |P|\}$ denote the original pattern id of the fragment mp in P. The following makes sure that the engine assignment is compatible with the lane assignment:

$$\sum_{e=\text{ENGINES\_PER\_LANE}*(l-1)}^{\text{ENGINES\_PER\_LANE}*l} m_{mp,e} = x_{orig(mp),l}, \quad \text{(Eq. 11)}$$

$$mp \in \{1 \ldots |MP|\}, l \in \{1 \ldots |L|\}.$$

In this section, |MP||E| integer variables have been introduced.

Regarding unlimited bit access per instruction of the compiler 20, the binary decision variable $z'_{t,s,e} \in \{0,1\}$ is introduced, which indicates whether a regular instruction of type t should be executed on state s and on engine e ($z'_{t,s,e}=1$) or not ($z'_{t,s,e}=0$). Let generators'(t,s) $\subset$ MP denote the set of patterns generating regular instructions of type t on state s.

The following establishes the relationship between $z'_{t,s,e}$ and $m_{mp,e}$:

$$z'_{t,s,e} = \underset{mp \in generators'(t,s)}{V} m_{mp,e}, s \in \{1 \ldots |S|\}, \quad \text{(Eq. 12)}$$

$$t \in \{1 \ldots |T_s|\}, e \in \{1 \ldots |E|\}.$$

The following constrains the number of different types of regular instructions executed on the same state and on the same engine:

$$\sum_{t=1}^{T_s} z'_{t,s,e} <= \text{REG\_INST\_PER\_CYCLE\_PER\_ENGINE}, \quad \text{(Eq. 13)}$$

$$s \in \{1 \ldots |S|\}, e \in \{1 \ldots |E|\}.$$

This section introduces $(\Sigma_{s \in S}|T_s|)|E|$ as additional integer variables.

Now, regarding limited bit access per instruction of the compiler 20, distribution of the patterns to the engines (e.g., the engines 14) may result in multiple regular instructions of the same type that exist on the same state, being mapped to the same engine. If the number of bits accessed simultaneously by the instructions of the same type exceeds BITS_PER_INSTRUCTION, multiple different instructions of the same type have to be generated. To support such a scenario, the constraints defined in Equations 12 and 13 are revised.

Let $z'_{t,s,e} \in Z$ denote the number of instructions of type t executed on state s and on engine e. Let $u'_{t,s,e} \in Z$ denote the number of bits accessed by the regular instructions of type t on state s and on engine e. Let $W'_{v,t,s,e} \in \{0,1\}$ indicate whether variable v is accessed by a regular instruction of type t on state s and on engine e ($w'_{v,t,s,e}=1$) or not ($w'_{v,t,s,e}=0$). Let def_users'(v, t, s) denote the set of patterns in MP accessing variable v using a regular instruction of type t on state s. Note that $w'_{v,t,s,e}$ is defined only if def_users'(v, t, s) is not empty.

The following establishes the relationship between $w'_{v,t,s,e}$ and $m_{mp,e}$:

$$w'_{v,t,s,e} = \underset{mp \in def\_users'(v,t,s)}{V} m_{mp,e}, v \in \{1 \ldots |V|\}, \quad \text{(Eq. 14)}$$

$$s \in \{1 \ldots |S|\}, t \in \{1 \ldots |T_s|\}, e \in \{1 \ldots |E|\}.$$

The following establishes the relationship between $u'_{t,s,e}$ and $w'_{v,t,s,e}$:

$$u'_{t,s,e} = \sum_{v=1}^{|V|} bitcount(v) * w'_{v,t,s,e}, s \in \{1 \ldots |S|\}, \quad \text{(Eq. 15)}$$

$$t \in \{1 \ldots |T_s|\}, e \in \{1 \ldots |E|\}.$$

The following establishes the relationship between $z'_{t,s,e}$ and $u'_{t,s,e}$:

$z'_{t,s,e} >= u'_{t,s,e}/\text{BITS\_PER\_INSTRUCTION}, s \in \{1 \ldots |S|\}, t \in \{1 \ldots |T_s|\}, e \in \{1 \ldots |E|\}.$ (Eq. 16)

The following constrains the number of regular instructions executed on the same state and on the same engine (a particular engine 14):

$$\sum_{t=1}^{T_s} z'_{t,s,e} <= \text{REG\_INST\_PER\_CYCLE\_PER\_ENGINE}, \quad \text{(Eq. 17)}$$

$$s \in \{1 \ldots |S|\}, e \in \{1 \ldots |E|\}.$$

This section may define up to $2(\Sigma_{s \in S}|T_s|)|E|+|V|(\Sigma_{s \in S}|T_s|)|E|$ additional integer variables. In other cases, the number may be much smaller because $w'_{v,t,s,e}$ is often undefined for many v,t,s,e combinations.

Regarding supporting per lane constraints of the compiler 20, assume that at most REG_INST_PER_CYCLE_PER_LANE regular instructions can be issued by the accelerator architecture per cycle and per lane. The number of regular instructions executed per state and per lane can be computed by using constraints similar to those described in Equations 12-17 without defining additional variables, and by replacing E with L, replacing MP with P, replacing mp with p, replacing $m_{mp,e}$ with $x_{p,l}$, and replacing REG_INST_PER_CYCLE_PER_ENGINE with REG_INST_PER_CYCLE_PER_LANE in Equations 12-17.

With respect to the total number of instructions per cycle constraint computed by the compiler 20, assume that at most TOT_INST_PER_CYCLE_PER ENGINE instructions (including default and/or regular instructions) can be issued by the accelerator architecture (accelerator 10) per engine and per cycle. For example, the compiler 20 creates a DFA (e.g., sets up a B-FSM) that includes both single character and multi-character fragments with instructions. Then, the compiler 20 can replace MP with MP∪SP and REG_INST_PER_CYCLE_PER_LANE with TOT_INST_PER_CYCLE_PER_ENGINE for Equations 11-17, and also these can be replaced to adapt the constraints on the total number of instructions per lane and per cycle similarly.

Given the details of the various mathematical equations implemented in a model of the compiler 20 as discussed above, the compiler 20 is configured to find a feasible distribution utilizing the constraints above. As an example, a feasible distribution that assigns pattern 1 to lane 1 can be computed as follows:

$$\max x_{1,1}: \quad \text{(Eq. 18)}$$

Let FP denote the final set of patterns after application of all pattern transformations by the compiler 20. An additional set of binary variables can be defined as $m_{fp,e} \in \{0, 1\}$, which indicate whether pattern fp is assigned to engine e ($m_{fp,e}=1$) or not ($m_{fp,e}=0$) for $fp \in \{1 \ldots |FP|\}, e \in \{1 \ldots |E|\}$. Note that the constraints formulated for Equations 10-17 already define equivalent variables for SP⊆FP and MP⊆FP. Therefore, when the constraints defined in Equations 10-17 are active, it is sufficient to define variables only for the patterns in NP ⊆FP. Assume that a pairwise cost function $c_{fp1,fp2}$ is given, which provides a measure of the cost of distributing patterns fp1,fp2∈FP to the same engine (e.g., a single engine 14). Then, the objective of the compiler 20 could be formulated as finding a feasible distribution that minimizes the cumulative cost, as described in:

$$\min \sum_{fp1=1}^{|FP|-1} \sum_{fp2=fp1+1}^{|FP|} \sum_{e=1}^{|E|} (c_{fp1,fp2} * (mfp1, e \wedge mfp2, e)). \quad \text{(Eq. 19)}$$

Example code is listed below which provides an approach that may be executed by the compiler 20:

```
1: DistributePatterns(P, SP, MP, NP, lane_count, final_distribution)
2: DefineVariablesAndConstraints(P, SP, MP, NP, lane_count,
      variables, constraints);
3: success = FindFeasibleDistribution(variables, constraints,
      first_distribution);
4: if success then
5:     RefineObjectiveFunction(objective);
6:     Optimize(objective, variables, constraints, first_distribution,
         final_distribution);
7: end if
8: return success;
9: ExploreSolutionSpace(P)
10: DecomposeRegularExpressions(P, SP, MP, NP);
11: lane_count = EstimateMinLanes(P, SP, MP, NP);
12: prev_memory_size = ∞
13: while lane_count < lane_count_limit do
14:     success = DistributePatterns(P, SP, MP, NP, lane_count,
         distribution);
15:     if success then
16:         BuildDFAsForDistribution(distribution, DFAs);
17:         if MemorySize(DFAs) < prev_memory_size then
18:             StoreSolution(lane_count, DFAs);
19:             prev_memory_size = MemorySize(DFAs);
20:         end if
21:     end if]
22:     lane count++;
23: end while
```

Figure 5:
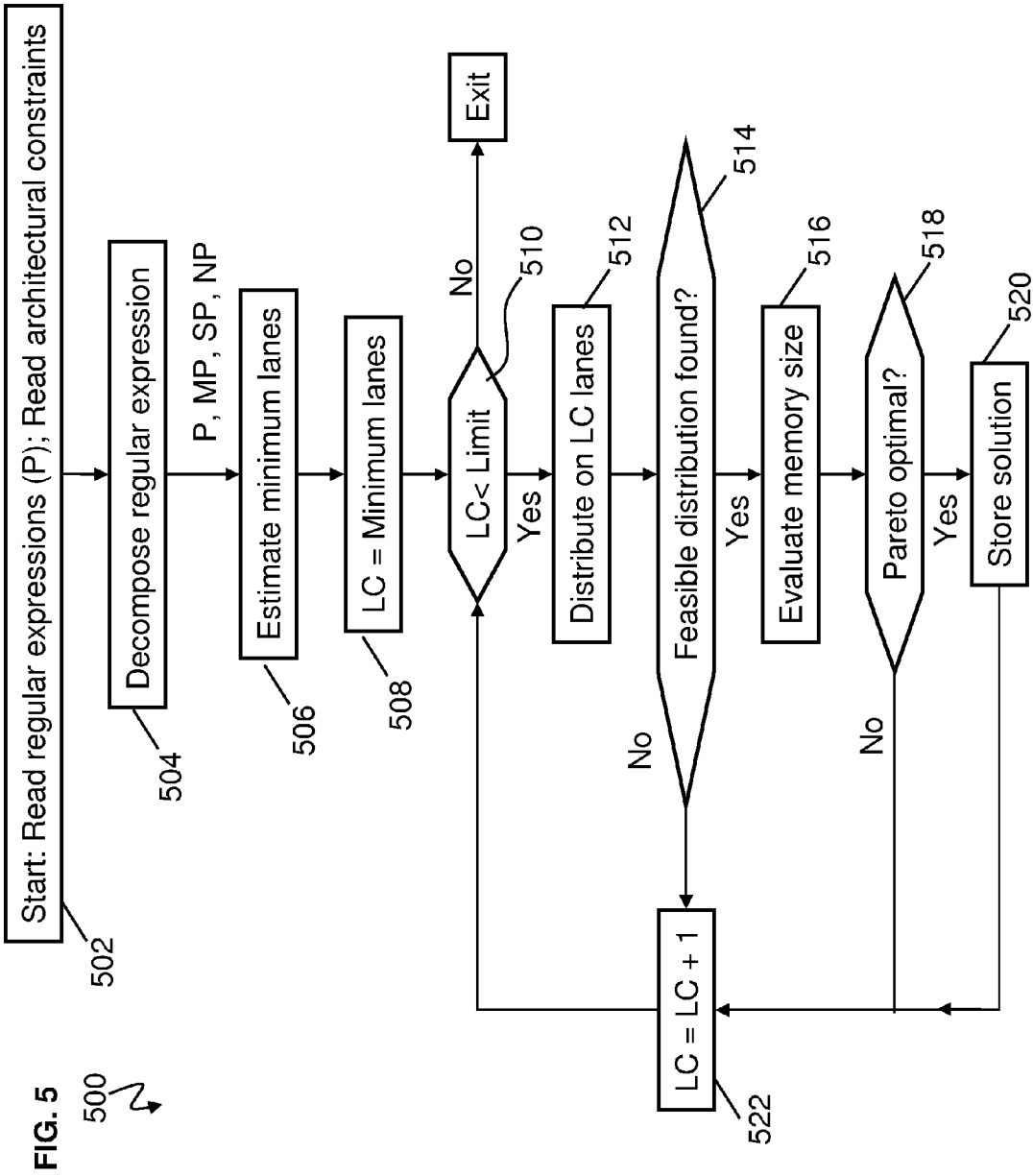
FIG. 5 depicts a flow chart which is an optimization implemented by a compiler according to an exemplary embodiment.
Figure 6:
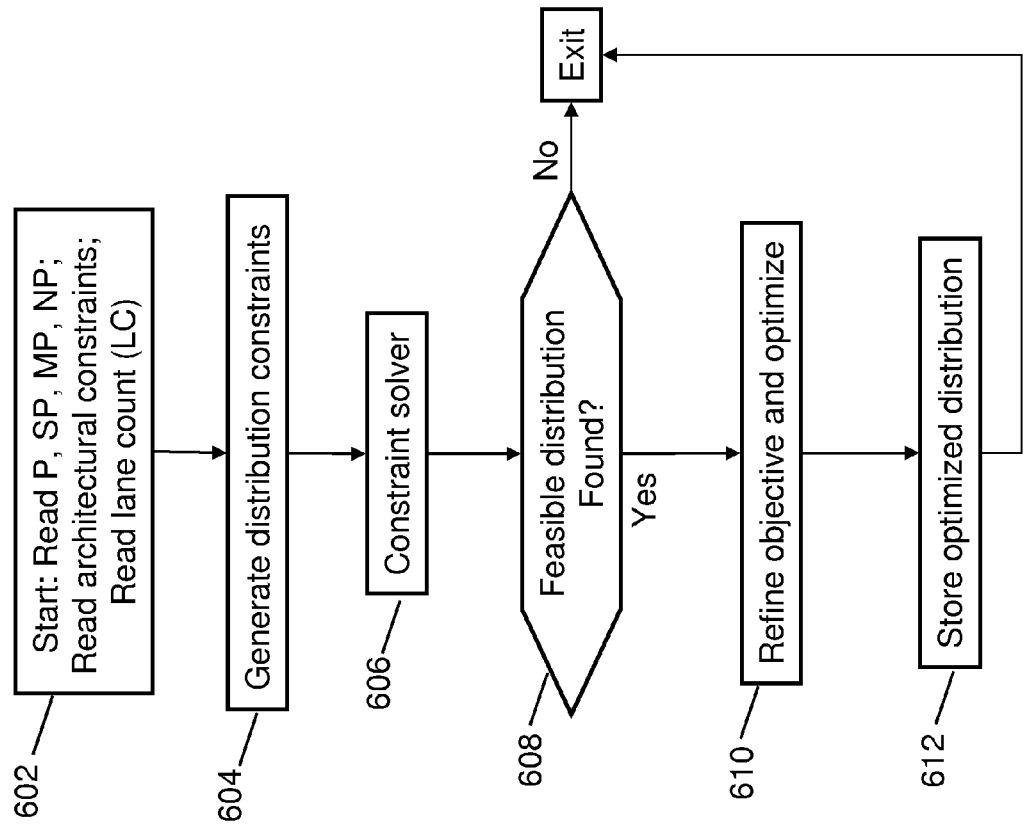
FIG. 6 depicts a flow chart which is an optimization implemented by a compiler according to an exemplary embodiment.

Starting with the pattern sets P, SP, MP, and NP, algorithms of the compiler 20 are configured to evaluate the size of the memory footprint (in the, e.g., transition rule memory of a respective engine 14) as a function of the lane count as seen in the code above. The compiler 20 is configured to execute (e.g., on the computer system 8) the Equations 1-19 as discussed herein for the corresponding constraints discussed herein. In FIGS. 5 and 6 below, lane_count in the pseudo code corresponds to LC.

Now, turning to FIG. 5, a flow chart 500 is an optimization implemented by the compiler 20 according to an exemplary embodiment.

The compiler 20 is configured to read regular expressions for an initial set of patterns and read architectural constraints (block 502). The compiler 20 is configured to take into account all of the various architectural constraints for the accelerator 10 hardware discussed herein. The compiler 20 is configured to decompose the regular expression (block 504). For example, the initial set of regular expressions P gets decomposed into SP, MP, and NP through of a set of regular expression transformations that aim to minimize the state space. Note that if no transformations are applied, NP is equal to the initial set of regular expressions.

The compiler 20 is configured to estimate the minimum number of lanes for the decomposed regular expression (block 506). For example, given P, SP, MP, and NP, the compiler 20 is configured to evaluate (e.g., ExploreSolutionSpace( ) function) a set of lane counts and to compute the size of the state space in terms of the memory footprint (to be stored in the transitions rule memory for engines 14 corresponding to a lane) for each lane count. From block 506, the estimated number of minimum lanes is set to LC by the compiler 20 (block 508).

The compiler 20 is configured to determine whether (LC<Limit) LC is less than the limit (block 510); the limit a predefined number of lanes. If LC is greater than the limit for the predefined number of lanes, the flow 500 exists. Otherwise, if the LC is less than the limit, the compiler 20 distributes (e.g., simulates) the decomposed pattern on the determined minimum number of (LC) lanes (block 512). Each lane corresponds to a preset (i.e., as determined by the physical hardware of the accelerator 10) number of engines 14 which is shown as four engines 14 per lane in FIG. 2. For example, an estimation function (e.g., EstimateMinLanes( ) function) may be utilized by the compiler 20 in identifying a lower bound on the minimum number of scan lanes needed to obtain a feasible distribution in block 508. Then, as discussed for block 512, the compiler 20 is configured to distribute (i.e., simulate) the initial set of patterns on the determined minimum number of scan lanes which is the lane count (LC). For example, the compiler 20 may determine that the LC needed is 2 for this initial set of patterns. The actual distribution of SP, MP, and NP to the available scan lanes and scan engines (e.g., engines 14 corresponding to a single scan lane) may be done in the DistributePatterns( ) function of the compiler 20.

The compiler 20 is configured to determine if a feasible distribution is found based on using the determined LC (block 514). FIG. 6 depicts a flow chart 600 that further describes finding a feasible distribution.

When the current determined LC is not feasible, the compiler 20 increases the LC by 1 (LC=LC+1) (block 522). If the compiler 20 determines that the distribution (current determined LC) is feasible, the compiler 20 is configured to evaluate the memory size for the corresponding engines 14 in the determined lanes by building a DFA for each corresponding engine 14 (e.g., if LC=2, then there would be eight engines 14 that will have their transition rule memory increased/affected to support the distributed patterns in the operation for block 512) (block 516). For example with the LC=2, the size of the memory footprint (in the transition rule memory of corresponding (e.g., eight) engines 14) for a distribution is evaluated by compiling the patterns mapped to the same scan lane, and summing up the sizes of the memory footprints of all the affected eight engines 14 (e.g., eight FSMs in those two scan lanes).

The compiler 20 is configured to determine if the estimated LC is pareto optimal (block 518). The compiler 20 checks whether the distribution for a previously evaluated LC (with a smaller lane count, e.g., 2) has a memory size (i.e., transition rule memory size 714) smaller than the distribution computed for the current LC (with a larger LC, e.g., 3), and if so the distribution found for the current LC is not pareto optimal. Otherwise, the distribution computed for the current determined LC with more lanes (i.e., LC+1) is pareto optimal. If the compiler 20 determines that the distribution for the current LC (i.e., current number of lanes utilized for a given set of patterns) is pareto optimal, then the compiler 20 stores the current solution (e.g., current LC and the corresponding transition rule memory for each engine) for the current LC (block 520) and continues. The compiler 20 can continue (iteratively) incrementing the lane count (LC) until the lane count reaches a predefined maximum lane count (set based on the physical hardware constraints of the accelerator 10, e.g., the total number of physical scan lanes available). The compiler 20 executes the flow 500 for each of the other sets of patterns (i.e., other regular expressions) that need to be compiled.

The (many) pareto optimal solutions generated by the iterations of the ExploreSolutionSpace( ) function are stored and can be later evaluated by an architectural simulator (implemented in the compiler 20), which also takes into account the impact of the memory subsystem. In this way, the compiler 20 can find the lane count (LC) that results in the best throughput for the given set of regular expressions (e.g., with the lowest memory consumption).

FIG. 6 depicts a flow chart 600 that further describes finding a feasible distribution (DistributePatterns( ) function) for distributing the patterns on the engines 14 in FIG. 5 according to an exemplary embodiment.

The compiler 20 is configured to read P, SP, MP, NP, read the architectural constraints of the accelerator 20, and read the lane count (LC) output from the block 510 (block 602).

The compiler 20 is configured to generate the distribution constraints from the architectural constraints of the accelerator 20 (block 604). The architectural constraints of the accelerator 20 may include but are not limited to the number of ENGINES_PER_LANE, BITS_PER_LANE, BITS_PER_INSTRUCTION, DEF_INST_PER_CYCLE_PER_LANE, DEF_INST_PER_CYCLE_PER_ENGINE, REG_INST_PER_CYCLE_PER_LANE, REG_INST_PER_CYCLE_PER_ENGINE, TOT_INST_PER_CYCLE_PER_LANE, and TOT_INST_PER_CYCLE_PER_ENGINE.

As seen in the code above and FIG. 5, the DistributePatterns( ) function generates a set of variables and constraints for a given lane count using the optimization model described in Equations 1-19. To distribute the patterns on the LC, the compiler 20 may use a constraint solver (e.g., an ILP solver) (block 606). The compiler 20 parses through all of the constraints defined herein (Equations 1-17) to check that each of the constraints is satisfied for an identified distribution (block 608). The compiler 20 can also take into account additional constraints (e.g., the size of memory that can be utilized by an engine 14 and/or by a scan lane can be limited) while deciding on the feasibility of a distribution. If a feasible distribution is not found, the flow 600 exists (e.g., to block 522 in FIG. 5).

If a feasible distribution is found, the compiler 20 can refine the objective function definition (e.g., Equation 19) and run additional optimization algorithms (block 610). The compiler 20 stores the optimized distribution (block 612) and exits. Note that the feasible distribution initially computed can be provided as an initial solution which can iteratively be refined. Alternatively and/or additionally, it is also possible to use heuristic algorithms, other exact methods (e.g., enumeration), and/or a combination of different methods to optimize the distribution.

Figure 7:
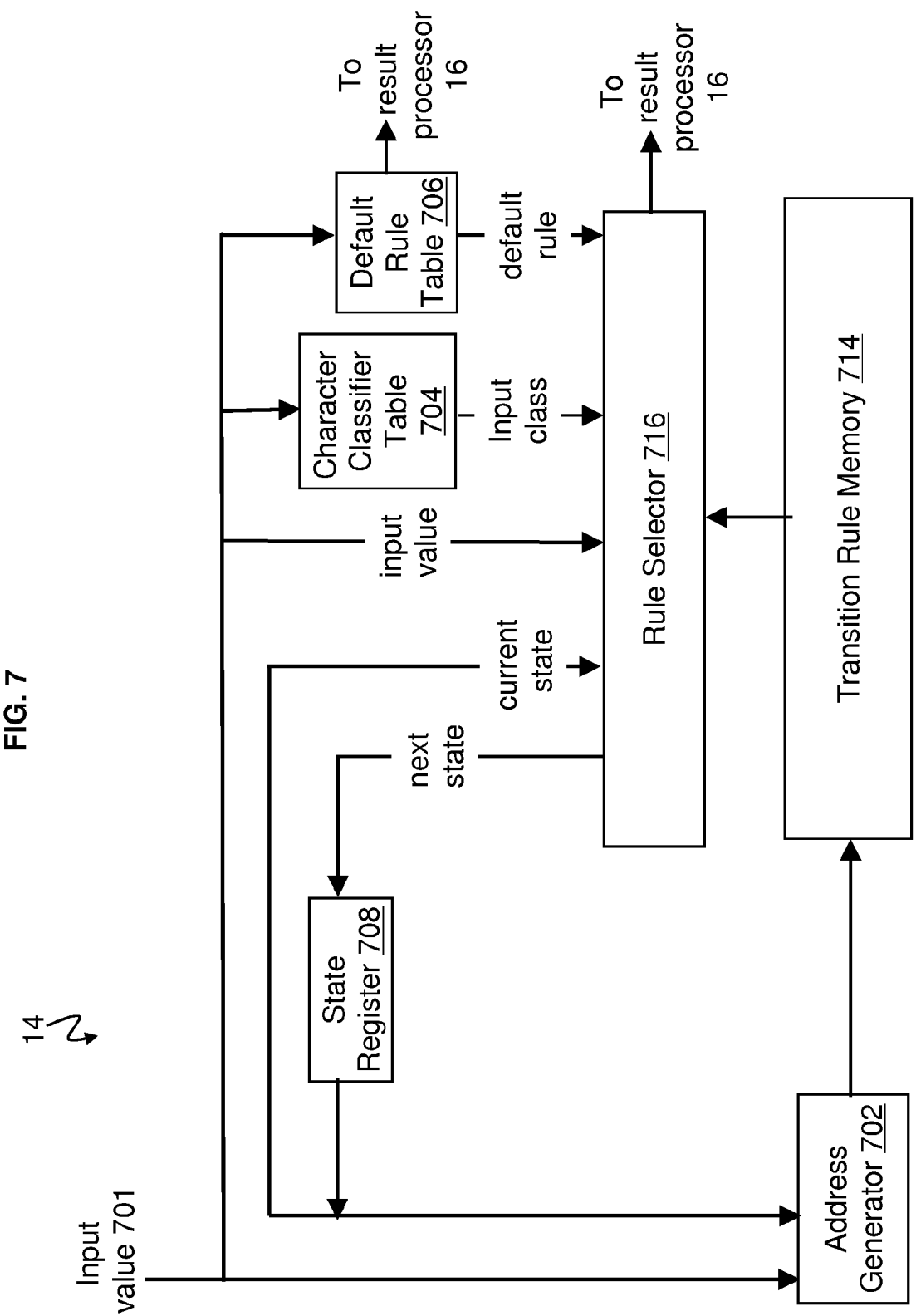
FIG. 7 depicts a block diagram of a scan engine in an accelerator according to an exemplary embodiment.

FIG. 7 depicts a block diagram as an example of the engine 14 in the accelerator 10 according to an exemplary embodiment. The engine 14 may be referred to as a FSM engine, which is a finite state machine (e.g., including hardware) that can be programmed to implement any DFA using transition rule memory 714.

The engine 14 receives an input value 701 (a part of the input stream of the network traffic) from the input controller 12 (shown in FIG. 1). The input value 701 is provided to an address generator 702, a character classifier table 704, a default rule table (i.e., default rule lookup table), and a rule selector 716. The address generator 702 also receives input from a state register 708. The address generator 702 generates an address for searching the transition rule memory 714. For example, the address may be a pointer to a list of transition rules in the transition rule memory 714. This address may be referred to as a hash index or memory address.

Using the address from the address generator 702, the transition rule memory 714 outputs one or more transition rules to the rule selector 716. Also, the character classifier 704 outputs an input class to the rule selector 716, the default rule table 706 outputs a default rule (which is used by the rule selector 104 if it does not find a matching transition rule in the transition rule memory 714) to the rule selector 716, and the address generator 702 outputs the address to the rule selector 716. The rule selector 716 determines a transition rule and match based on the input value 701 and outputs an instruction on a fragment match to the execution unit 202 (of the register 18) connected to the physical scan lane corresponding to this particular engine 14. The rule selector 716 also provides an output to the state register 708, and the state register 708 outputs the current state to the address generator 702. The default rule table 706 also can send a default instruction to the result processor 16 (corresponding to the scan lane for this particular engine 14).

Figure 8:
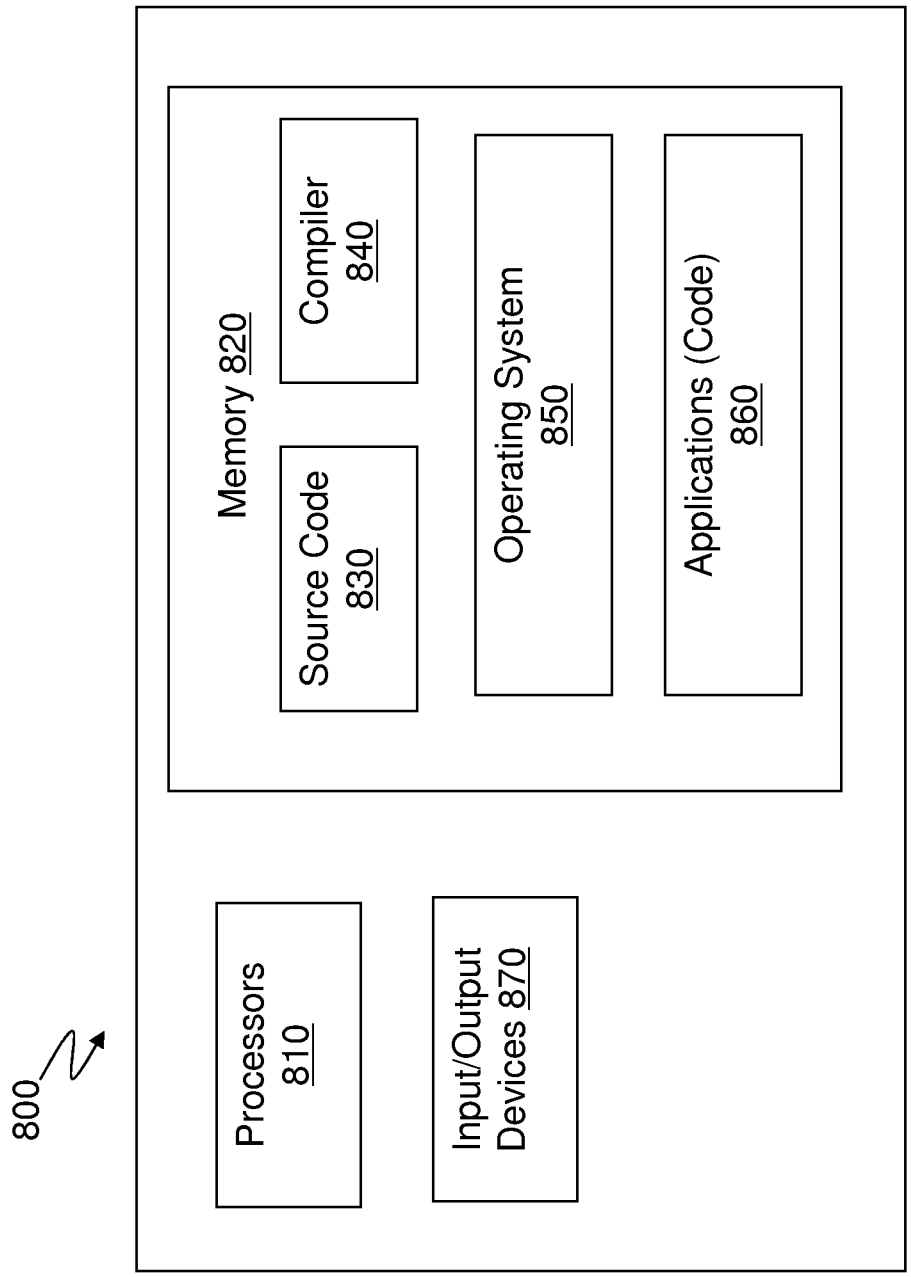
FIG. 8 depicts a computing system having features that may be utilized according to an exemplary embodiment.

FIG. 8 illustrates an example of a computer 800 having capabilities, which may be included in exemplary embodiments. Various methods, procedures, modules, flow diagrams, tools, application, and techniques discussed herein may also incorporate and/or utilize the capabilities of the computer 800. Moreover, capabilities of the computer 800 may be utilized to implement features of exemplary embodiments discussed herein, and one or more of the capabilities of the computer 800 may be utilized in conjunction with any element discussed herein.

Generally, in terms of hardware architecture, the computer 800 may include one or more processors 810, computer readable storage memory 820, and one or more input and/or output (I/O) devices 870 that are communicatively connected via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800.

The computer readable memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the computer readable memory 820 may include one or more separate programs, each of which comprises an ordered listing of executable instructions for implementing logical functions. The software in the memory 820 includes a suitable operating system (O/S) 850, compiler 840, source code 830, and one or more applications 860 of the exemplary embodiments. As illustrated, the application 860 comprises numerous functional components for implementing the features, processes, methods, functions, and operations of the exemplary embodiments. Further, the application 860 may be a source program, executable program (object code), script, or any other entity comprising a set of instructions to be performed.

The I/O devices 870 may include input devices (or peripherals) such as, for example but not limited to, a mouse, keyboard, scanner, microphone, camera, etc. Furthermore, the I/O devices 870 may also include output devices (or peripherals), for example but not limited to, a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver (tower), a telephonic interface, a bridge, a router, etc. The I/O devices 870 also include components for communicating over various networks, such as the Internet or an intranet. The I/O devices 870 may be connected to and/or communicate with the processor 810 utilizing Bluetooth connections and cables (via, e.g., Universal Serial Bus (USB) ports, serial ports, parallel ports, fiber optics, FireWire, HDMI (High-Definition Multimedia Interface), etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for determining scan lanes, the method comprising:

for a set of patterns, a pattern compiler estimating a number of scan lanes to be utilized on an accelerator of a computer processor;

the pattern compiler iteratively incrementing, by one scan lane, the number of the scan lanes estimated for the set of patterns to optimize a throughput of the accelerator, each of the scan lanes having been iteratively incremented comprises a group of synchronized finite state machine engines that read and modify contents of a register and an execution unit on the accelerator, wherein iteratively incrementing the number of the scan lanes comprises incrementing from a lower number of the scan lanes to a higher number of the scan lanes;

the pattern compiler distributing the set of patterns to the number of the scan lanes as a distribution;

the pattern compiler evaluating a size of a memory space needed for the distribution to distribute the set of patterns onto the lower number of the scan lanes versus the higher number of the scan lanes; and the pattern compiler selecting the number of the scan lanes as the lower number of the scan lanes or the higher number of the scan lanes based on which one of the lower number or the higher number has a smallest size of the memory space needed for distributing the set of patterns;

wherein the number of the scan lanes selected for the set of patterns comprises a first physical scan lane through a last physical scan lane on the accelerator based on selecting the number of scan lanes as the lower number or the higher number;

wherein a result processor comprises the register and the execution unit;

wherein the group of engines is a same number in each of the first through the last physical scan lanes;

wherein the group of engines in one of the first through the last physical scan lanes do not physically connect to the execution unit and the register in another one of the first through the last physical scan lanes.

2. The method of claim 1, wherein estimating the number of scan lanes to be utilized on the accelerator comprises finding the number of the scan lanes needed to distribute the set of patterns onto the group of engines corresponding to the number of scan lanes.

3. The method of claim 1, wherein estimating the number of scan lanes to be utilized on the accelerator comprises accounting for the architecture constraints of the accelerator.

4. The method of claim 3, wherein accounting for the architecture constraints of the accelerator comprises accounting for the group of engines per lane, bits per lane, bits per instruction, default instructions per cycle per lane, default instructions per cycle per engine, regular instructions per cycle per lane, regular instructions per cycle per engine, total instructions per cycle per lane, and total instructions per cycle per engine.

5. The method of claim 1, wherein iteratively incrementing the number of the scan lanes estimated for the set of patterns to optimize the throughput of the accelerator comprises checking whether increasing the number of scan lanes results in a memory consumption of the accelerator being lower or the throughput of the accelerator being higher.

6. The method of claim 1, wherein iteratively incrementing the number of the scan lanes estimated for the set of patterns to optimize the throughput of the accelerator comprises checking whether increasing the number of scan lanes results in delaying other sets of patterns from running.

7. The method of claim 1, further comprising storing the distribution which is a pareto-optimal distribution.

8. A computer system configured to determine scan lanes, the computer system comprising:

memory configured to store a pattern compiler; and a processor, functionally coupled to the memory, the processor being responsive to computer-executable instructions contained in the pattern compiler and configured for:

for a set of patterns, estimating a number of scan lanes to be utilized on an accelerator;

iteratively incrementing, by one scan lane, the number of the scan lanes estimated for the set of patterns to optimize a throughput of the accelerator, each of the scan lanes having been iteratively incremented comprises a group of synchronized finite state machine engines that read and modify contents of a register and an execution unit on the accelerator, wherein iteratively incrementing the number of the scan lanes comprises incrementing from a lower number of the scan lanes to a higher number of the scan lanes;

distributing the set of patterns to the number of the scan lanes as a distribution;

evaluating a size of a memory space needed for the distribution to distribute the set of patterns onto the lower number of the scan lanes versus the higher number of the scan lanes; and selecting the number of the scan lanes as the lower number of the scan lanes or the higher number of the scan lanes based on which one of the lower number or the higher number has a smallest size of the memory space needed for distributing the set of patterns;

wherein the number of the scan lanes selected for the set of patterns comprises a first physical scan lane through a last physical scan lane on the accelerator based on selecting the number of scan lanes as the lower number or the higher number;

wherein a result processor comprises the register and the execution unit;

wherein the group of engines is a same number in each of the first through the last physical scan lanes;

wherein the group of engines in one of the first through the last physical scan lanes do not physically connect to the execution unit and the register in another one of the first through the last physical scan lanes.

9. The computer system of claim 8, wherein estimating the number of scan lanes to be utilized on the accelerator comprises finding the number of the scan lanes needed to distribute the set of patterns onto the group of engines corresponding to the number of scan lanes.

10. The computer system of claim 8, wherein estimating the number of scan lanes to be utilized on the accelerator comprises accounting for the architecture constraints of the accelerator.

11. The computer system of claim 10, wherein accounting for the architecture constraints of the accelerator comprises accounting for at least one of engines per lane, bits per lane, bits per instruction, default instructions per cycle per lane, default instructions per cycle per engine, regular instructions per cycle per lane, regular instructions per cycle per engine, total instructions per cycle per lane, and total instructions per cycle per engine.

12. The computer system of claim 8, wherein iteratively incrementing the number of the scan lanes estimated for the set of patterns to optimize the throughput of the accelerator comprises checking whether increasing the number of scan lanes results in the throughput of the accelerator being higher.

13. The computer system of claim 8, wherein iteratively incrementing the number of the scan lanes estimated for the set of patterns to optimize the throughput of the accelerator comprises checking whether increasing the number of scan lanes results in delaying other sets of patterns from running.

14. The computer system of claim 8, further comprising storing the distribution.

15. A computer program product for determining scan lanes, the computer program product comprising:

a non-transitory computer readable storage medium having computer readable program code that causes a computer to execute instructions stored in the non-transitory computer readable medium as follows:

for a set of patterns, a pattern compiler estimating a number of scan lanes to be utilized on an accelerator;

the pattern compiler iteratively incrementing, by one scan lane, the number of the scan lanes estimated for the set of patterns to optimize a throughput of the accelerator, each of the scan lanes having been iteratively incremented comprises a group of synchronized finite state machine engines that read and modify contents of a register and an execution unit on the accelerator, wherein iteratively incrementing the number of the scan lanes comprises incrementing from a lower number of the scan lanes to a higher number of the scan lanes;

the pattern compiler distributing the set of patterns to the number of the scan lanes as a distribution;

the pattern compiler evaluating a size of a memory space needed for the distribution to distribute the set of patterns onto the lower number of the scan lanes versus the higher number of the scan lanes; and the pattern compiler selecting the number of the scan lanes as the lower number of the scan lanes or the higher number of the scan lanes based on which one of the lower number or the higher number has a smallest size of the memory space needed for distributing the set of patterns;

wherein the number of the scan lanes selected for the set of patterns comprises a first physical scan lane through a last physical scan lane on the accelerator based on selecting the number of scan lanes as the lower number or the higher number;

wherein a result processor comprises the register and the execution unit;

wherein the group of engines is a same number in each of the first through the last physical scan lanes;

wherein the group of engines in one of the first through the last physical scan lanes do not physically connect to the execution unit and the register in another one of the first through the last physical scan lanes.

16. The computer program product of claim 15, wherein estimating the number of scan lanes to be utilized on the accelerator comprises finding the number of the scan lanes needed to distribute the set of patterns onto the group of engines corresponding to the number of scan lanes.

17. The computer program product of claim 15, wherein estimating the number of scan lanes to be utilized on the accelerator comprises accounting for the architecture constraints of the accelerator.

18. The computer program product of claim 17, wherein accounting for the architecture constraints of the accelerator comprises accounting for at least one of engines per lane, bits per lane, bits per instruction, default instructions per cycle per lane, default instructions per cycle per engine, regular instructions per cycle per lane, regular instructions per cycle per engine, total instructions per cycle per lane, and total instructions per cycle per engine.

19. The computer program product of claim 15, wherein iteratively incrementing the number of the scan lanes estimated for the set of patterns to optimize the throughput of the accelerator comprises checking whether increasing the number of scan lanes results in the throughput of the accelerator being higher.

20. The computer program product of claim 15, wherein iteratively incrementing the number of the scan lanes estimated for the set of patterns to optimize the throughput of the accelerator comprises checking whether increasing the number of scan lanes results in delaying other sets of patterns from running.

* * * * *